(12) United States Patent
Alekseev

(10) Patent No.: US 12,025,096 B1
(45) Date of Patent: Jul. 2, 2024

(54) GUIDE VANE ASSEMBLY FOR A VERTICAL AXIS WIND TURBINE

(71) Applicant: ZEUUS Inc, New York, NY (US)

(72) Inventor: Nikolai Alekseev, Novobessergenevka (RU)

(73) Assignee: ZEUUS Inc, New York, NY (US)

( * ) Notice: Subject to any disclaimer, the term of this patent is extended or adjusted under 35 U.S.C. 154(b) by 0 days.

(21) Appl. No.: 18/180,876

(22) Filed: Mar. 9, 2023

Related U.S. Application Data

(60) Provisional application No. 63/357,755, filed on Jul. 1, 2022.

(51) Int. Cl.
*F03D 3/04* (2006.01)
*F03D 3/00* (2006.01)

(52) U.S. Cl.
CPC ........... *F03D 3/0409* (2013.01); *F03D 3/005* (2013.01)

(58) Field of Classification Search
CPC ............................... F03D 3/0409; F03D 3/005
See application file for complete search history.

(56) References Cited

U.S. PATENT DOCUMENTS 6,984,899 B1 * 1/2006 Rice ................ F03D 15/10
290/55

* cited by examiner

*Primary Examiner* — Viet P Nguyen
(74) *Attorney, Agent, or Firm* — Michael D. Eisenberg

(57) ABSTRACT

The guide vane assembly for partially surrounds a vertical axis wind turbine (VAWT), and comprising a front guide and a side guide. The front guide extends ahead of the VAWT and covers a first portion of the VAWT. The front guide has a first inner side and a first outer side meeting at a first leading edge, the first inner side extending from the first leading edge to a first trailing edge and having a shape configured to accelerate incoming air flow from a front of the system into the VAWT. The side guide has a second inner side and a second outer side meeting at a second leading edge located laterally to the uncovered portion of the turbine and aligned with or to the side and behind a frontmost edge of the VAWT. The second inner side extends concavely around the VAWT toward a rear of the VAWT.

17 Claims, 3 Drawing Sheets

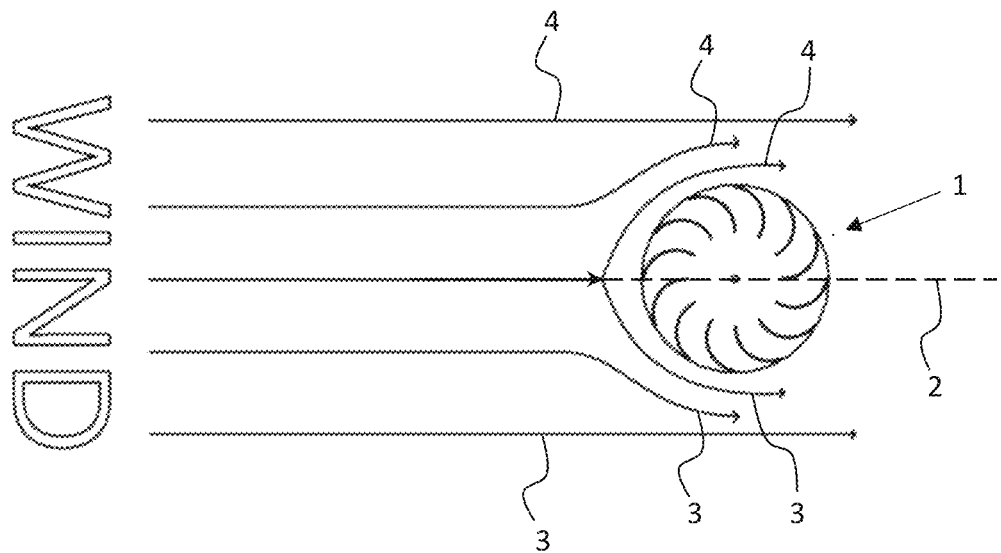
Fig. 1 (General Art)
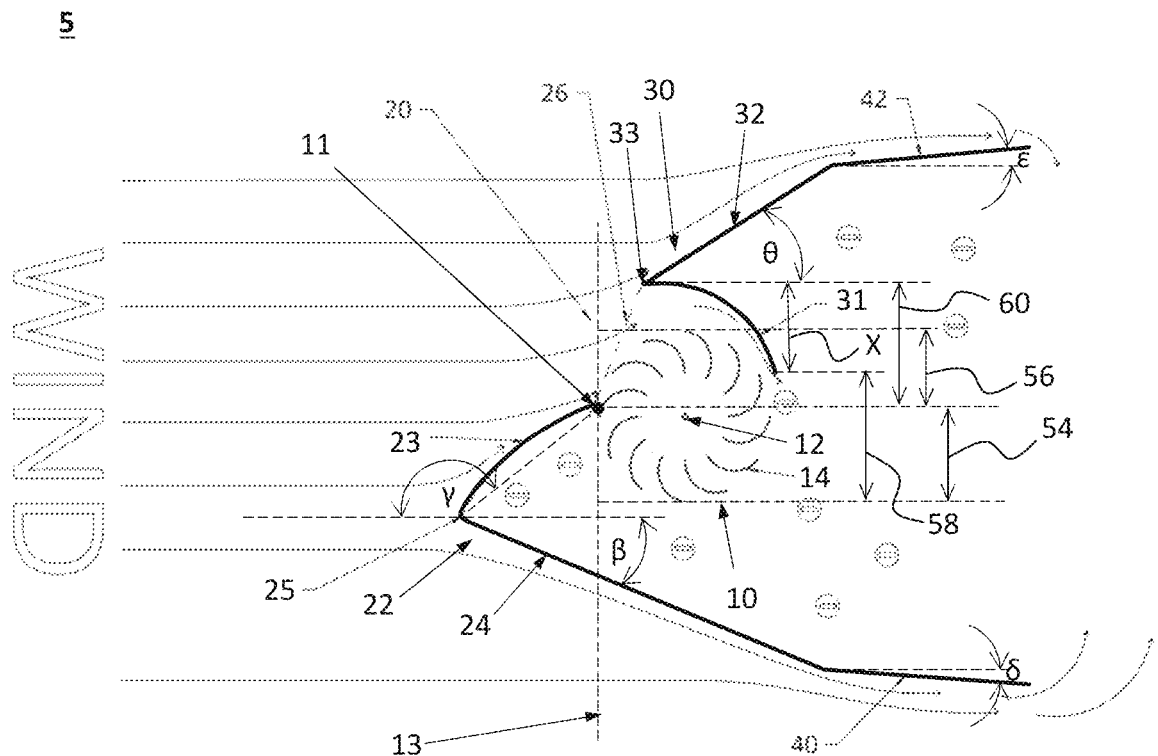
Fig. 2

GUIDE VANE ASSEMBLY FOR A VERTICAL AXIS WIND TURBINE

CROSS-REFERENCES TO RELATED APPLICATIONS

The present application claims priority from U.S. Provisional Application Ser. No. 63/357,755 filed on Jul. 1, 2022, which is hereby incorporated in its entirety.

TECHNICAL FIELD

This invention relates to wind turbines.

BACKGROUND OF THE INVENTION

Wind turbines use wind power to rotate. The rotation is converted into electrical energy by an electrical generator. Vertical-axis wind turbines (VAWT) use incoming winds to rotate about a vertical axis.

FIG. 1 shows a top view of a VAWT 1 known in the general art. VAWT 1 has a central horizontal axis 2 which divides the VAWT 1 into two halves. The VAWT 1 divides the oncoming wind flow into two parts about the central horizontal axis 2. The blades of the VAWT are curved. Therefore, most of the first part 4 of the flow contacts the convex sides of the blades and creates a certain resistance on the blades. The second part 3 meets the concave sides of the blades, which offer less resistance. The difference in resistance between the concave and convex sides of the turbine blades creates a torque that is used to rotate the generator shaft.

BRIEF SUMMARY OF INVENTION

An aim of the present invention is to increase the efficiency of a VAWT, to generate more torque and therefore more electricity, from wind at different speeds.

Therefore, an aspect of some embodiments of the present invention relates to a wind turbine system, comprising a vertical axis wind turbine (VAWT) and a guide vane assembly. The VAWT has a vertical axis, is configured to rotate around the vertical axis, and comprises a plurality of blades disposed circumferentially around the vertical axis. The guide vane assembly partially surrounds the VAWT and comprises a front guide and a side guide. The front guide extends ahead of the VAWT and covers a first portion of the VAWT while leaving a second portion of the VAWT uncovered. The front guide has a first inner side and a first outer side meeting at a first leading edge, the first inner side extending from the first leading edge to a first trailing edge and having a shape configured to accelerate incoming air flow from a front of the system into the VAWT via the second portion of the VAWT. The side guide has a second inner side and a second outer side meeting at a second leading edge, the second leading edge being located on a lateral side of the uncovered portion of the turbine. The second inner side extends concavely around the VAWT toward a rear of the VAWT. The second leading edge is aligned with or to the side and behind a frontmost edge of the VAWT. The inlet into the VAWT is formed between the first trailing edge and the second leading edge.

In a variant, the first outer side and the second outer side diverge from each other from front to back.

In another variant, the system includes a first stabilizer and a second stabilizer, the first stabilizer extending behind a trailing end of the first outer side and the second extending behind a trailing end of the second outer side.

In yet another variant, the first stabilizer bends inwards with respect to the first outer surface, while the second stabilizer bends inwards with respect to the second outer surface.

In a further variant, the vane assembly is mounted on the vertical axis of the VAWT and is configured to rotate about the vertical axis independently of the VAWT.

In yet a further variant: the vane assembly is mounted on the vertical axis of the VAWT and is configured to rotate about the vertical axis independently of the VAWT; and a divergence of the first and second stabilizer relative to each other causes the vane assembly to rotate according to a direction of a wind flow so that the first leading edge of front guide faces the wind flow.

In some embodiments of the present invention, for at least some of the blades: each blade has a curvature between 25% and 35%; a first distance between a leading edge of a blade and a midpoint of a nearby blade which faces a convex side of the blade is substantially equal to a second distance between trailing edges of the blade and the nearby blade; a third distance between the blade and the nearby blade anywhere between the first and second distances is larger than the first and second distances.

In a variant, for at least some of the blades: an outer radius is between an outer edge of the blade and central axis of the VAWT; an inner radius is between an inner edge of the blade and the central axis of the VAWT; a connection line is between the inner edge and the outer edge of the blade; a non-zero tilt angle is formed between the outer radius and the connection line; the inner radius is tilted with respect to the outer radius in a direction of a rotational motion of the VAWT.

In another variant, the tilt angle is between 12 and 20 degrees.

In some embodiments of the present invention, at least one of the front guide and the side guide is hollow.

Another aspect of some embodiments of the present invention relates to a guide vane assembly configured to be used in conjunction with a vertical axis wind turbine (VAWT) having a vertical axis, configured to rotate around the vertical axis, and comprising a plurality of blades disposed circumferentially around the vertical axis. The guide vane assembly is configured to partially surrounds a VAWT and comprises a front guide and a side guide. The front guide extends ahead of the VAWT and covers a first portion of the VAWT while leaving a second portion of the VAWT uncovered. The front guide has a first inner side and a first outer side meeting at a first leading edge, the first inner side extending from the first leading edge to a first trailing edge and having a shape configured to accelerate incoming air flow from a front of the guide vane into the VAWT via the second portion of the VAWT. The side guide has a second inner side and a second outer side meeting at a second leading edge, the second leading edge being located on a lateral side of the uncovered portion of the turbine, the second inner side extending concavely around the VAWT toward a rear of the VAWT. The second leading edge is aligned with or to the side and behind a frontmost edge of the VAWT. The inlet into the VAWT is formed between the first trailing edge and the second leading edge.

In a variant, the first outer side and the second outer side diverge from each other from front to back.

In another variant, the guide vane assembly comprises a first stabilizer and a second stabilizer, the first stabilizer extending behind a trailing end of the first outer side and the second extending behind a trailing end of the second outer side.

In yet another variant, the first stabilizer bends inwards with respect to the first outer surface, while the second stabilizer bends inwards with respect to the second outer surface.

In a further variant, the vane assembly is mounted on the vertical axis of the VAWT and is configured to rotate about the vertical axis independently of the VAWT.

In yet another variant, the vane assembly is mounted on the vertical axis of the VAWT and is configured to rotate about the vertical axis independently of the VAWT, a divergence of the first and second stabilizer relative to each other causes the vane assembly to rotate according to a direction of a wind flow so that the first leading edge of front guide faces the wind flow.

In a variant, at least one of the front guide and the side guide is hollow.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 1 shows a top view of a VAWT, known in the general art;

FIG. 2 is a top view of a wind turbine system having a VAWT and a guide vane assembly, according to some embodiments of the present invention;

DETAILED DESCRIPTION OF THE EMBODIMENTS OF THE INVENTION

Figure 3:
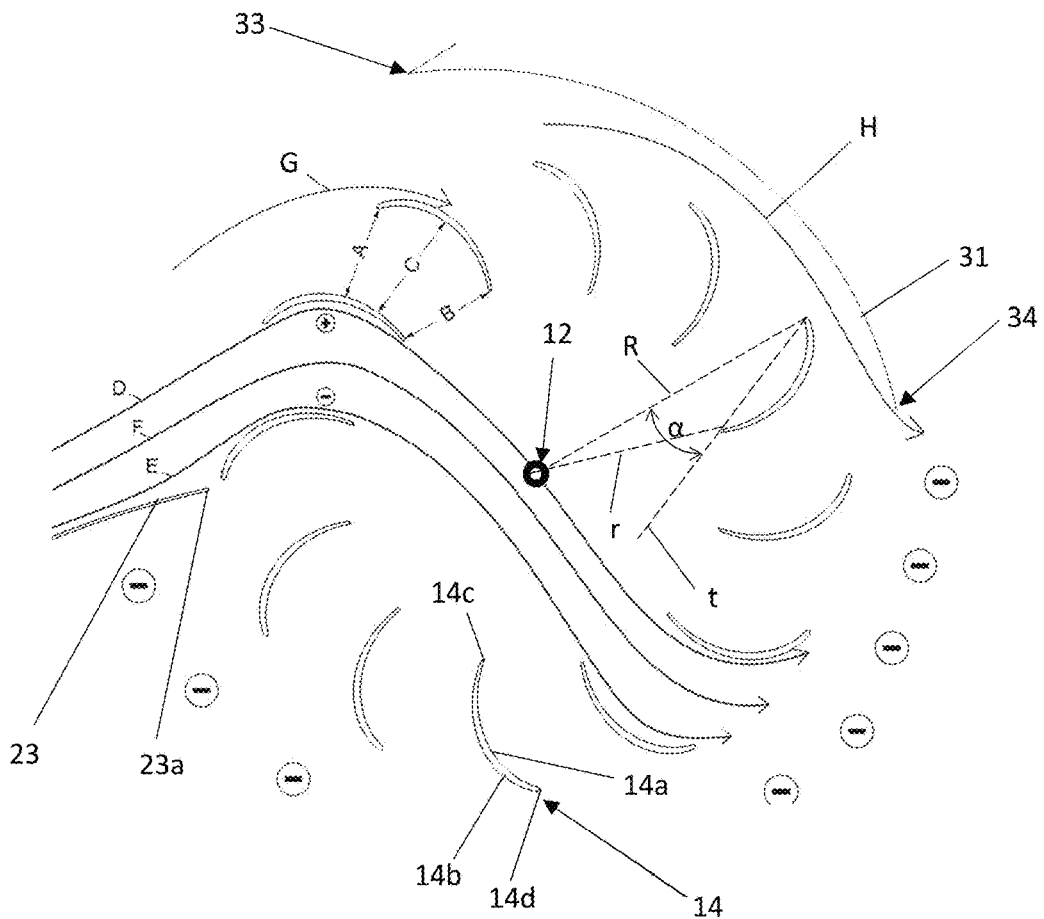
FIG. 3 is an example of the wind turbine that can be part of the system of FIG. 2, according to some embodiments of the present invention.

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Referring now to FIG. 2, the wind turbine system 5 includes a VAWT 10 and a guide vane assembly 20. The VAWT 10 has a central vertical axis 12 and a plurality of blades 14 disposed circumferentially around the vertical axis 12. The VAWT is configured to rotate about the central vertical axis 12. In some embodiments of the present invention, the blades are set such that air flow is enabled from the front of the VAWT through the VAWT and out of the back of the VAWT. For example, the blades may be disposed near the circumference of the VAWT, such that the trailing edge of each blade is at a non-zero distance from the vertical axis 12. The front is defined as the portion of the VAWT facing incoming air flow (wind).

Each blade 14 is curved to have a concave side and convex side. The resistance offered to incoming air flow incident to the concave side is larger than the resistance offered to incoming air flow incident to the convex side.

Figure 5:
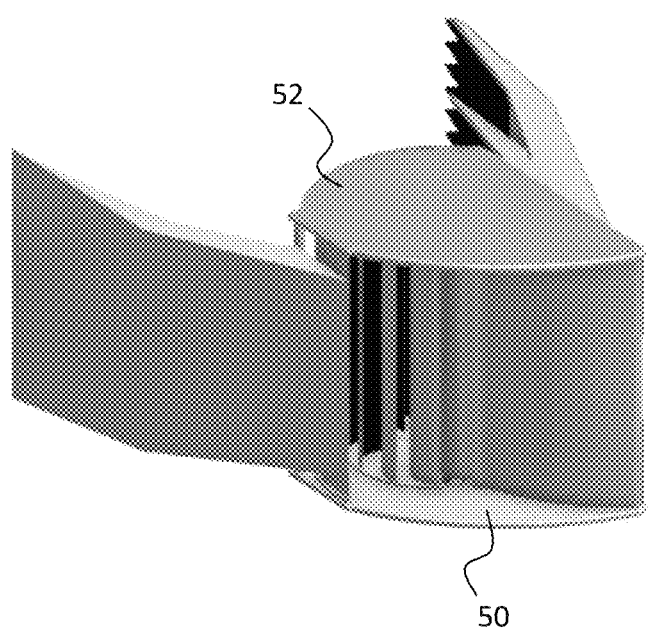
FIG. 5 a perspective view of the wind turbine system of FIG. 2.

The guide vane assembly 20 partially surrounds the VAWT 10 and includes a front guide 22 and a side guide 30. The guide vane assembly extends vertically from a bottom plate 50 below the VAWT 10 to a top plate 52 above the VAWT 10, as seen in FIG. 5. Optionally, the guide vane 20 also includes divergent stabilizers 40 and 42 as well.

The front guide 22 extends away from (ahead of, upwind of) the VAWT 10 and covers a portion 54 of the VAWT which is at least half of the VAWT 10. In some embodiments of the present invention, the covered portion 54 of the VAWT extends from a lateral edge to the VAWT to about the middle of the VAWT. For example, the width of the covered portion 54 may be between 40% and 60% of the diameter of the VAWT. The front guide 22 has an inner side 23 which leads the air toward the VAWT 10, an outer side 24 which leads air away from the VAWT 10, and leading edge 25 where the inner side 23 and the outer side 24 meet ahead (upstream) of the VAWT 10. The inner side 23 has a convex surface, a predominantly convex surface or any other surface configured to accelerating the air flow, such as a spiral. The inner side has a trailing edge 23a disposed near the front of the VAWT 10. Therefore, the inner side 23 of the front guide 22 extends from the leading edge 25 to the VAWT 10 and is configured to accelerate air to the VAWT to enter the VAWT via the uncovered portion 56 of the VAWT 10.

The side guide 30 has an inner side 31, and outer side 32, and a leading edge 33 which is located on a side of the turbine 10 that is laterally opposite the side of the turbine covered by the front guide 22. The inner side 31 and the outer side 32 meet at the leading edge 33. The inner side 31 of the side guide 30 faces the VAWT 10 and extends concavely around VAWT 10, toward the rear of the VAWT and directs airflow (part of which is accelerated by the inner side 23 of the front guide 22) towards the rear half of the VAWT 10. The inner side 31 ends at a second trailing edge 34 and only covers a portion of the rear of the turbine, so that a rear opening 58 is formed in the guide vane assembly behind the turbine, between the second trailing edge 34 and an inner surface (facing the VAWT) of the outer side 24. In this manner airflow can leave the guide vane assembly 20 through the rear opening 34. The rear opening 58 has a width perpendicular to the air flow.

The leading edge 33 of the side guide 30 is located on the lateral side of the VAWT 10 and is either aligned with or to the side and downstream of (behind) the frontmost edge 11 of the turbine 10. Therefore, an air inlet 26 is formed between the leading edge 33 of the side guide 30 and the trailing edge 23a of inner side 23 of the front guide 33. The air inlet 26 effectively passes the incoming air flow (part of which is accelerated by the inner side 23 of the front guide 22) to the VAWT 10 with no resistance. The air inlet has a width 60 perpendicular to the air flow (and parallel to the width of the of rear opening 58. There is no side wall ahead of the leading edge 33 of the side guide 30. Thus, there is no tapering inlet opening ahead of the frontmost edge 11 of VAWT 10 that could create a pressure bubble ahead of the VAWT 10, which would slow down the movement of air into the VAWT 10.

In some embodiments of the present invention, the width of the rear opening 58 is larger than the width 60 of the air inlet 26. In this manner the creation of a high-pressure area that could obstruct flow through the VAWT 10 is prevented or decreased.

Part of the air flow is prevented from reaching the VAWT 10, and is instead guided away from VAWT by the outer sides 24 and 32. In some embodiments of the present invention, the outer side 24 of the front guide 22 and the outer side 32 of the side guide 30 diverge from each other from front to back and contribute to achieving a low pressure region behind the VAWT 10. The signs (−) in FIG. 2 indicate the low-pressure region. Based on measurements by the inventors for incoming wind (free flow velocity) of about 10 m/s, the rarefaction at the back of the guide vane assembly behind the VAWT relative to atmospheric pressure is −1.5 cm of water column. This low-pressure region pulls air from the front of the VAWT 10 and further increases the speed of the air flow passing through the space between the turbine blades 14, thus increasing the rotation speed of the VAWT 10. The rear of the guide vane assembly 20 behind the second inner surface 31 and behind the VAWT is an open outlet, so that the air that entered the air inlet 26 can leave the guide vane assembly 20.

In some embodiments of the present invention, a first divergent stabilizer 40 extends from the trailing end of the outer side 24 of the front guide 22, while a second divergent stabilizer 42 extends from the trailing end of the outer side 32 of the side guide 30.

The stabilizers 40 and 42 trail behind the respective outer sides 24 and 32, and are configured to create a low pressure region downstream of the VAWT 10. In some embodiments of the present invention, the stabilizers 40 and 42 bend inwards with respect to the respective outer surfaces 24 and 42, while still diverging from each other. In this manner, a convex shape is formed on each lateral side of the guide vane assembly 20, which provides additional acceleration of the flow around guide vane assembly 20 (Bernoulli's law) to further decrease the pressure behind the VAWT 10. In the example of FIG. 2, the stabilizers 40 and 42 bend inwards sharply from the respective outer sides 24 and 32. In some embodiments of the present invention, the stabilizers 40 and 42 curve inward from the respective outer sides 24 and 32.

In some embodiments of the present invention, the front guide 22 is hollow. In this manner a vacuum is created in the hollow part of the front guide 22. In some embodiments of the present invention, the rear guide 30 is hollow. In this manner a vacuum is created in the hollow part of the rear guide 30.

The low-pressure region behind the VAWT 10 increases the air velocity through the guide vane assembly 20, as if the vane assembly were moving into the wind. In some experiments conducted by the inventors, the diverging outer sides 24 and 32 (and the diverging stabilizers 40 and 42, as well, if present) create a pressure gradient of 2.5-3 cm of a water column between the front and the rear of the VAWT 10, at a free flow velocity of 10 m/s. The pressure gradient is created as the dynamic pressure of the oncoming wind flow relative to atmospheric pressure is +1.2-1.5 cm of water column at the air inlet 26, while the vacuum relative to atmospheric pressure is 1.2-1.5 cm of the water column behind the guide surfaces 31, 32, 23 and 24.

Besides increasing the speed of the airflow through the VAWT and increasing the efficiency of the turbine, it should be noted that the shape of the guide vane assembly 20 also causes the vane assembly to turn to face the wind, so that the front guide 22 always faces the wind and the leading edge 25 is always in upwind of the VAWT. In this manner, the guide vane assembly 20 turns as the wind changes direction, and enables the vane assembly to accelerate the wind toward VAWT 10 no matter what the direction of the wind is.

The guide vane assembly 20 is mounted on same vertical axis 12 of the VAWT 10, and is configured to rotate about the vertical axis 12 independently of the VAWT 10. Due to their divergence, the outer sides 24 and 32 act as aerodynamic stabilizers and set the guide vane assembly 20 to face of the oncoming wind flow, with the leading edge of front guide facing the oncoming wind flow. The diverging stabilizers 40 and 42 are located farther from the turbine axis than the front guide 22, and therefore the vane assembly 20 acts as a weather vane.

The first outer surface 24 is at an angle $\theta$ with respect to a forward-to-backward axis (the axis of the incoming wind). The second outer surface 32 has an angle $\theta$ with respect to the forward-to-backward axis. The first stabilizer 40 has an angle $\delta$ with respect to the forward-to-backward axis. The second stabilizer 42 has an angle c with respect to the forward-to-backward axis. The chord line of the first inner surface 23 (the line between the first leading edge 25 to the trailing edge 23a) has an angle $\gamma$ with respect to the forward-to-backward axis. The front line 13 is perpendicular crosses the foremost edge 11 and is parallel to the forward-to-backward axis.

In a non-limiting example, the inventor has experimented with the following features (all with an error of ±15%): $\varepsilon=\delta=5$ degrees; $\beta=22.5$ degrees; $\theta=32$ degrees; $\gamma=140$ degrees; diameter of the VAWT=1.1 m; distance between the leading edge 25 to the front line 13 is 0.85 m. Width X between the leading edge 33 and the end of the inner side 31 is about 0.59 m. It should be noted that these values are non-limiting examples, and that the scope of the present invention extends to the features described above having different values.

Referring now to FIG. 3, an example is shown of the VAWT 10 that can be used as part of the system 5 of FIG. 2, according to some embodiments of the present invention. A VAWT having a profile pictured in FIG. 3 was used in experiments conducted by the inventors. However, other turbines with other profiles may be used as well.

The profile of each blade 14 is strongly curved, so as to obtain enhanced lift. The curvature of the blades may be, for example, between 25% and 35%. Each blade 14 has a convex side 14a and a concave side 14b.

Dimension A between the leading edge of a blade and the center (midpoint) of the nearby blade facing the convex side of the first blade is substantially equal to (with an error of ±5%) the dimension B between the trailing edges both blades. Dimension C, which is the distance between the two blades between the input dimension A and output dimension B is larger than the dimensions A and B. This shape prevents compression of the air flowing between the blades. Compression would lead to the formation of an overpressure bubble and stagnation of the flow.

The velocity of the flow F (between two blades) is equal to the average of the velocities of flows D and E. The speed in the flow D is less than the velocity of flow F (because D propagates along the concave surface of the blade). The velocity of the flow E is greater than the free stream velocity of the flow F, as the flow E is accelerated by the convex side of the blade. The average velocity of the flow F is equal to the free stream velocity flow (the speed of the oncoming flow, which is equal to the wind speed).

Accordingly, the pressure on the blade 14 is reduced on the concave side 14b, and significantly increased on the convex part 14a. The pressure difference between the convex and concave sides of the blade creates an additional lifting force, which is added to the force of the dynamic pressure of the oncoming flow. Experiments by the inventors have shown that the sum of the force generated by the dynamic pressure of the incoming flow and the force generated by the pressure difference between the sides of a blade is 1.2-1.5 times greater than the force generated by the dynamic pressure of the incoming flow alone. Thus, the design of the turbine blades allows an additional 20-50% increase in the overall efficiency of the turbine.

Flow G between entering the VAWT between the trailing edge 23a and the leading edge 33 has a high speed and is directed to the blades and released into the atmosphere. Flow H flowing along the inner concave side 31 has a low speed and is directed away from the blades.

Figure 4:
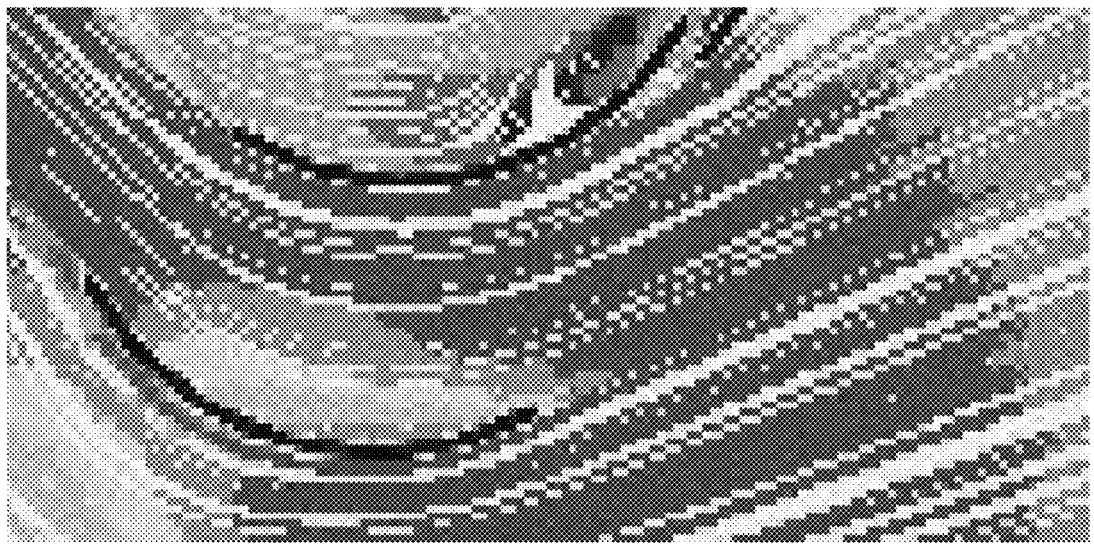
FIG. 4 is the output of a simulation showing flow velocities in the vicinity of blades of the VAWT of FIG. 3.

The computer simulation (FIG. 4) shows how the free flow velocities are distributed on the concave and convex surfaces of the turbine blade profile. The blue and green colors in the vicinity of the convex surfaces indicate low flow velocities (high pressure), while the red color in the vicinity of the concave surfaces indicate high flow velocity (low pressure).

In some embodiments of the present invention, the blades are curved such that the inner edges 14c of the blades are pointed to the central axis 12.

In some embodiments of the present invention the blades 14 are tilted with respect to the outer radius R between the outer (leading) edge 14d of a blade to the central axis 12 of the VAWT. The connection line t extends between the outer (leading) edge 14d of a blade and the inner (trailing) edge 14c of the same blade. The line R is the outer radius connecting the outer (leading) edge 14d of the same blade to the central axis 12 of the VAWT. In some embodiments of the present invention, the tilt indicated by the angle α between the line r and the line t is between 12 and 20 degrees. The line r is the inner radius of the VAWT, between the inner (trailing) edge 14c of the same blade to the central axis 12. For any given blade 14, the inner radius r is tilted with respect to the outer radius R in the direction of the rotational motion of the blade (which is clockwise, in this non-limiting example). It should be noted that the lines R, t, and r are not physical elements of the VAWT, but geometrical features used to define and explain the tilt of the blades. It should be understood that the tilted configuration of the blades is a non-limiting example, and that different configurations of the blades, with different tilts, orientations, or no tilt at all, may be used as well.

The inventors have conducted experiments, both in a wind tunnel and on the field, in which the electrical power generated by a VAWT with the guide vane assembly described above was compared to the electrical power generated by the VAWT alone without the guide vane assembly.

In both setups, the diameter of the VAWT was 0.5 m, the height of the VAWT was 1 m, and the wind blew at 10-11 m/s. Without a guide vane assembly, the rotation of the VAWT generated 62 Watt. With the guide vane assembly described above, VAWT generated 273 Watt.

It should be noted that while the system 5 described above includes the VAWT and the guide vane assembly, the scope of the invention extends to the system 5 as a whole, to the guide vane assembly 20 by itself for use with any type VAWT with curved blades, and the particular VAWT described in depth in FIG. 3.

What is claimed is:

1. A wind turbine system, comprising a vertical axis wind turbine (VAWT) and a guide vane assembly, wherein:
   the VAWT has a vertical axis, is configured to rotate around the vertical axis, and comprises a plurality of blades disposed circumferentially around the vertical axis;
   the guide vane assembly partially surrounds the VAWT and comprises:
      a front guide extending ahead of the VAWT and covering a first portion of the VAWT while leaving a second portion of the VAWT uncovered, the front guide having a first inner side and a first outer side meeting at a first leading edge, the first inner side extending from the first leading edge to a first trailing edge and having a shape configured to accelerate incoming air flow from a front of the system into the VAWT via the second portion of the VAWT;
      a side guide having a second inner side and a second outer side meeting at a second leading edge, the second leading edge being located on a lateral side of the uncovered portion of the turbine, the second inner side extending concavely around the VAWT toward a rear of the VAWT;
   the second leading edge is aligned with or to the side and behind a frontmost edge of the VAWT;
   an inlet into the VAWT is formed between the first trailing edge and the second leading edge.

2. The system of claim 1, wherein the first outer side and the second outer side diverge from each other from front to back.

3. The system of claim 2, comprising a first stabilizer and a second stabilizer, the first stabilizer extending behind a trailing end of the first outer side and the second extending behind a trailing end of the second outer side.

4. The system of claim 3, wherein the first stabilizer bends inwards with respect to the first outer surface, while the second stabilizer bends inwards with respect to the second outer surface.

5. The system of claim 2, wherein:
   the vane assembly is mounted on the vertical axis of the VAWT and is configured to rotate about the vertical axis independently of the VAWT; and
   a divergence of the first and second stabilizer relative to each other causes the vane assembly to rotate according to a direction of a wind flow so that the first leading edge of front guide faces the wind flow.

6. The system of claim 1, wherein the vane assembly is mounted on the vertical axis of the VAWT and is configured to rotate about the vertical axis independently of the VAWT.

7. The system of claim 1, wherein, for at least some of the blades:
   each blade has a curvature between 25% and 35%;
   a first distance between a leading edge of a blade and a midpoint of a nearby blade which faces a convex side of the blade is substantially equal to a second distance between trailing edges of the blade and the nearby blade;
   a third distance between the blade and the nearby blade anywhere between the first and second distances is larger than the first and second distances.

8. The system of claim 7, wherein, for at least some of the blades:

an outer radius is between an outer edge of the blade and central axis of the VAWT;

an inner radius is between an inner edge of the blade and the central axis of the VAWT;

a connection line is between the inner edge and the outer edge of the blade;

a non-zero tilt angle is formed between the outer radius and the connection line;

the inner radius is tilted with respect to the outer radius in a direction of a rotational motion of the VAWT.

9. The system of claim 8, wherein the tilt angle is between 12 and 20 degrees.

10. The system of claim 1, wherein at least one of the front guide and the side guide is hollow.

11. A guide vane assembly configured to be used in conjunction with a vertical axis wind turbine (VAWT) having a vertical axis, configured to rotate around the vertical axis, and comprising a plurality of blades disposed circumferentially around the vertical axis, wherein:

the guide vane assembly is configured to partially surrounds a VAWT and comprises:

a front guide extending ahead of the VAWT and covering a first portion of the VAWT while leaving a second portion of the VAWT uncovered, the front guide having a first inner side and a first outer side meeting at a first leading edge, the first inner side extending from the first leading edge to a first trailing edge and having a shape configured to accelerate incoming air flow from a front of the system into the VAWT via the second portion of the VAWT;

a side guide having a second inner side and a second outer side meeting at a second leading edge, the second leading edge being located on a lateral side of the uncovered portion of the turbine, the second inner side extending concavely around the VAWT toward a rear of the VAWT;

the second leading edge is aligned with or to the side and behind a frontmost edge of the VAWT;

an inlet into the VAWT is formed between the first trailing edge and the second leading edge.

12. The guide vane assembly of claim 11, wherein the first outer side and the second outer side diverge from each other from front to back.

13. The guide vane assembly of claim 12, comprising a first stabilizer and a second stabilizer, the first stabilizer extending behind a trailing end of the first outer side and the second extending behind a trailing end of the second outer side.

14. The guide vane assembly of claim 13, wherein the first stabilizer bends inwards with respect to the first outer surface, while the second stabilizer bends inwards with respect to the second outer surface.

15. The guide vane assembly of claim 12, wherein:

the vane assembly is mounted on the vertical axis of the VAWT and is configured to rotate about the vertical axis independently of the VAWT; and a divergence of the first and second stabilizer relative to each other causes the vane assembly to rotate according to a direction of a wind flow so that the first leading edge of front guide faces the wind flow.

16. The guide vane assembly of claim 11, wherein the vane assembly is mounted on the vertical axis of the VAWT and is configured to rotate about the vertical axis independently of the VAWT.

17. The guide vane assembly of claim 11, wherein at least one of the front guide and the side guide is hollow.

\* \* \* \* \*